(12) United States Patent
Frenz et al.

(10) Patent No.: US 7,594,496 B2
(45) Date of Patent: Sep. 29, 2009

(54) METHOD AND DEVICE FOR OPERATING A DRIVE UNIT OF A VEHICLE

(75) Inventors: Thomas Frenz, Noerdlingen (DE); Martin Streib, Vaihingen (DE); Andreas Kufferath, Besigheim (DE)

(73) Assignee: Robert Bosch GmbH, Stuttgart (DE)

( * ) Notice: Subject to any disclaimer, the term of this patent is extended or adjusted under 35 U.S.C. 154(b) by 157 days.

(21) Appl. No.: 10/583,655

(22) PCT Filed: Dec. 20, 2004

(86) PCT No.: PCT/EP2004/053619

§ 371 (c)(1),
(2), (4) Date: Jun. 26, 2007

(87) PCT Pub. No.: WO2005/061875

PCT Pub. Date: Jul. 7, 2005

(65) Prior Publication Data

US 2008/0022969 A1    Jan. 31, 2008

(30) Foreign Application Priority Data

Dec. 20, 2003   (DE)   ............... 103 60 340
Jul. 8, 2004   (DE)   ............ 10 2004 033 081

(51) Int. Cl.
*F02P 5/00* (2006.01)
*F02D 31/00* (2006.01)

(52) U.S. Cl. .................. 123/406.23; 123/406.11; 123/351

(58) Field of Classification Search .......... 123/434, 123/406.11, 406.12, 406.18, 406.23, 406.26; 701/101, 114, 116
See application file for complete search history.

(56) References Cited

U.S. PATENT DOCUMENTS

| | | | | |
|---|---|---|---|---|
| 5,603,672 A * | 2/1997 | Zhang | .................. | 477/110 |
| 5,921,216 A | 7/1999 | Ballman et al. | | |
| 5,947,863 A * | 9/1999 | Grob et al. | .................. | 477/109 |
| 6,098,592 A * | 8/2000 | Hess et al. | .................. | 123/350 |
| 6,125,314 A * | 9/2000 | Graf et al. | .................. | 701/53 |
| 6,357,419 B1 * | 3/2002 | Langer et al. | .............. | 123/443 |
| 6,782,877 B2 * | 8/2004 | Nau et al. | ................ | 123/559.3 |

\* cited by examiner

*Primary Examiner*—John T Kwon
(74) *Attorney, Agent, or Firm*—Kenyon & Kenyon LLP

(57) ABSTRACT

A method and a device for operating a drive unit of a vehicle are provided, which result in reduced fuel consumption in the overrun condition. An output variable of the drive unit is set, in this context, according to a preset driving strategy in the overrun condition of the drive unit. At least two preset driving strategies are specified for the overrun condition of the drive unit. In the overrun condition, one of the specified driving strategies is selected as a function of a driving situation.

18 Claims, 6 Drawing Sheets

METHOD AND DEVICE FOR OPERATING A DRIVE UNIT OF A VEHICLE

FIELD OF THE INVENTION

The present invention relates to a method and to a device for operating a drive unit of a vehicle.

BACKGROUND INFORMATION

Methods and devices for operating a drive unit of a vehicle are known, in which an output variable of the drive unit, for instance, an engine speed or a torque is predefined. In vehicles having an internal combustion engine, for example, the air supply to the internal combustion engine is set by an actuator. A throttle valve is usually used as the actuator to do this.

For the purpose of economizing on usage, in modem Otto engines in overrun condition, the injection of fuel is shut off, if possible. In this context, the throttle valve is closed. Consequently, the result is a great braking torque of the internal combustion engine, the so-called engine brake. Because of the large engine braking torque, in overrun condition the vehicle clearly loses speed. In certain driving situations this may be undesirable, and the driver must get out of the overrun condition again in a short period of time. If the throttle valve were open in this case, a clearly lower engine braking torque would come about, and the vehicle could be operated in overrun condition longer.

At a high engine speed, if the driver releases the accelerator, the engine normally goes into so-called overrun fuel cutoff, that is, the overrun condition in which no fuel is injected any more. However, as soon as the engine speed drops below a predefined threshold value, or if, for example, catalyst protective functions prohibit the overrun fuel cutoff, fuel injection again takes place, and therewith torque generation again takes place. In this case this is called a firing overrun condition. This is done for various reasons:

1. If the engine speed continues to drop rapidly, then, in the case of maintaining the overrun fuel cutoff, the danger exists that the engine will shut down, since then, in the case of falling below the predefined idling speed, torque cannot be built up fast enough.

2. In idling operation, the engine has to produce just so much torque as is necessary for the compensation of the torque losses that come about, for instance, because of friction or the operation of ancillary components. If the engine speed is only slightly above the predefined idling speed, the torque cannot be abruptly driven down to zero, since otherwise the idling control circuit would become unstable.

3. If the driver releases the accelerator, this may mean that he wishes to stop as quickly as possible. In this case it would be desirable that, while observing the boundary conditions with respect to engine technology and control technology, the lowest possible torque is set. But it may also mean that the driver wishes to roll along as long as possible, using the momentum the vehicle still has. In this case it would be desirable that the burnt fuel is converted to kinetic energy as optimally efficiently as possible. It may even be desirable to combust an increased air quantity and fuel quantity.

Using the vehicle application data, it is uniformly established for all cases what charge and what ignition angle efficiency is to be set, if the firing overrun condition exists. In various driving situations, this is not optimal.

It may happen that the driver wishes to stop because of a red traffic light. In this case, based on an application designed for good rolling behavior, torque is built up unnecessarily which is immediately compensated for by increased braking. This leads to unnecessary fuel usage, and besides that, to increased break wear. Or, the driver might want to use the momentum of the vehicle for rolling, as long as possible. However, if the firing overrun condition is designed for minimal torque, the ignition angle is drawn to the latest possible value, that is, the mixture is combusted at poor efficiency. The driver has to compensate for the deceleration connected with this by stepping on the gas again earlier, which also acts to increase usage.

SUMMARY OF THE INVENTION

By contrast, the method according to the present invention and the device according to the present invention for operating the drive unit of a vehicle have the advantage that, for the overrun condition of the drive unit, at least two preset driving strategies are prespecified and that, in the overrun condition, one of the prespecified driving strategies is selected as a function of a driving situation. In this way, that particular driving strategy may be selected for the overrun condition of the drive unit which is most suitable for the current driving situation, for instance, with respect to achieving fuel usage that is as low as possible.

The selected driving strategy is particularly simple to implement if the output variable is set by at least one actuating variable of the drive unit, and the at least one actuating variable is set as a function of the selected driving strategy.

In the case of the use of an internal combustion engine, air supply to the internal combustion engine of the drive unit, an ignition angle, a fuel supply to the internal combustion engine and a gear transmission are especially suitable as the actuating variable.

It is particularly advantageous if a first driving strategy is selected when a certain driving situation is present in which the air supply is decreased and/or the ignition angle is set in the late direction and/or the fuel supply is decreased and/or the gear transmission is lowered, and, if a second driving situation is present, a second driving strategy is selected in which the air supply is increased and/or the ignition angle is set in the direction early and/or the fuel supply is increased and/or the gear ratio is increased. In this manner, with the aid of the first driving strategy, the output variable of the drive unit may be lowered for a deceleration operating mode of the vehicle, and with the aid of a second driving strategy, the output variable of the drive unit may be maintained or even increased for the implementation of a rolling operating mode.

It is particularly advantageous if the driving situation is ascertained by evaluating a gradient of a variable derived by operating an operating element or of a variable derived from a specification for the output variable of the drive unit, and the first driving situation is detected if a prespecified threshold value is undershot by the gradient, and the second driving situation is detected if the prespecified threshold value is exceeded by the gradient. In this way, the driving situation may be determined especially reliably in the light of the driver's commands.

An additional advantage comes about if the air supply that is to be set and/or the ignition angle that is to be set and/or the fuel supply that is to be set and/or the gear ratio that is to be set is ascertained as a function of the gradient of the variable derived from the operation of the operating element or the variable derived from the specification for the output variable of the drive unit, in each case using a characteristics line or in each case a characteristics map. In this way, the actuating variable or the actuating variables may be set in a more refined form as a function of the driving situation.

An additional advantage comes about if the driving situation is ascertained by the evaluation of an operation of the brake pedal, and the first driving situation is detected if the brake pedal is pressed and the second driving situation is detected if the brake pedal is released. In this way, the driving situation may also be ascertained in an especially reliable and simple manner.

An additional advantage comes about if the driving situation is ascertained by the evaluation of information on an inclination of the vehicle with respect to the horizontal, and the first driving situation is detected in response to the exceeding of a predefined threshold value by the absolute value of the inclination, and the second driving situation is detected in response to the absolute value of the inclination undershooting the predefined threshold value. In this way, the driving situation may be ascertained independently of the driver's command.

The reliability of the ascertainment of the driving situation may be raised in that the driving situation is ascertained by the evaluation of a driving speed or of a preceding vehicle or of a recognized obstacle on the roadway or of a traffic routing. This ascertainment of the driving situation is also independent of the driver's command. The reliability in the ascertainment of the driving situation may further be raised in that the first driving situation is detected if, within a predefinable time, a gear downshifting is detected and otherwise the second driving situation is detected. In the case of an automatic transmission, the reliability in the ascertainment of the driving situation may be raised in that the first driving situation is detected if, in the case of an automatic transmission, the position of a selector lever, or of an operating element corresponding to this, is in a different setting than "drive" or "D", and otherwise, the second driving situation is detected. Moreover, it is advantageous if, upon the detection of a fault on a safety-relevant component of the vehicle or the drive unit, the air supply is reduced and/or the ignition angle is shifted in the direction towards late and/or the fuel supply is reduced and/or the gear ratio is reduced. It is ensured, in this way, that a faulty and safety-critical operation of the vehicle is avoided.

An additional advantage comes about if a probability for the presence of the first driving situation or the second driving situation is ascertained as a function of which condition or which conditions are present for detecting the appropriate driving situation, and the first driving situation or the second driving situation is only detected if the corresponding probability of their presence exceeds a predefined threshold value. In this way, it is taken into consideration that, in the ascertainment of the driving situation based on one or more of the conditions named, a faulty interpretation of such a condition may occur in view of the currently existing driving situation. In this context, while considering the probability of the presence of the first driving situation or the second driving situation, one or more driving strategies may be implemented as a compromise between the first driving strategy and the second driving strategy. This permits a more discriminating adaptation of the driving strategy used to the current driving situation.

It is also advantageous if a minimum value is prespecified for the output value during the selection of the first driving strategy. In this way, the desired deceleration mode may be implemented in a particularly simple and reliable manner.

Moreover, it is advantageous if the output variable of the drive unit is reduced by the first driving strategy and if the output variable of the drive unit is maintained or increased by the second driving strategy. In this way, the first driving strategy may be used particularly simply for the deceleration mode of the vehicle, and the second driving strategy may be used particularly simply for the rolling mode of the vehicle.

DETAILED DESCRIPTION

Figure 1:
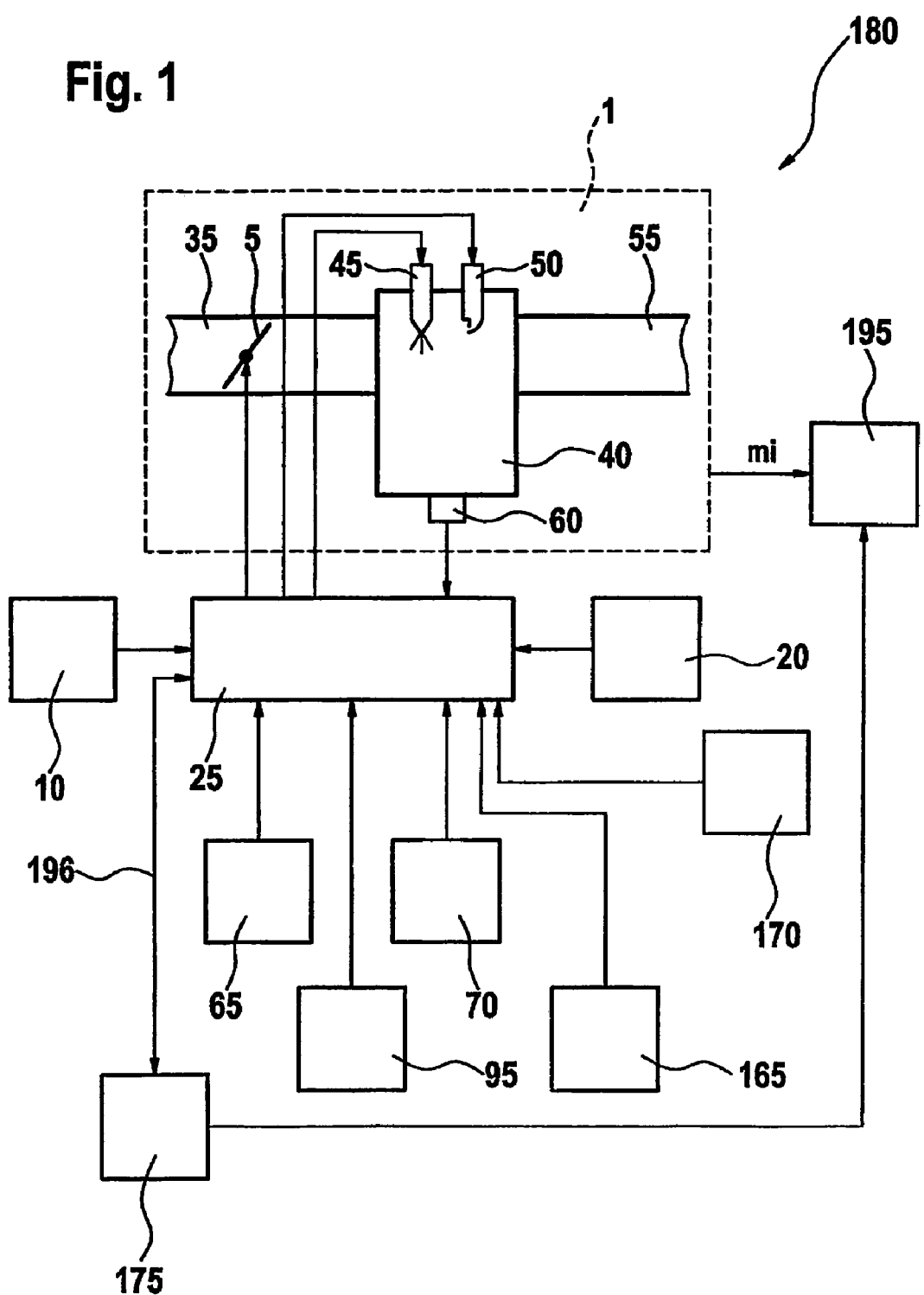
FIG. 1 shows a block diagram of a drive unit of a vehicle having an internal combustion engine.

In FIG. 1, 180 denotes a drive unit of a vehicle. Drive unit 180 includes an internal combustion engine 1, which may be designed, for instance, as an Otto engine or a Diesel engine. In the following, it is assumed in an exemplary manner that internal combustion engine 1 is designed as an Otto engine. Internal combustion engine 1 includes one or more cylinders 40, whose combustion chambers are supplied with combustion air via an air supply 35. An actuator 5 is situated in air supply 35, which, in this example, is intended to be developed as an electronically controlled throttle valve, and whose degree of opening is set by an engine control 25. In this way, one may set or influence the cylinder charge as a function of the degree of opening of throttle valve 5. In the case of direct injection of fuel into individual cylinders 40, as indicated in FIG. 1, the fuel is injected into the combustion chamber of the respective cylinders via in each case one fuel injector 45, the injection quantity and the injection time also being specified by engine control 25. Alternatively, the injection of fuel could also take place into the section of air supply 35 designated as intake manifold, between throttle valve 5 and the intake valve of cylinder 40 that is not shown in FIG. 1 for reasons of clarity. The air/fuel mixture formed in the combustion chamber of cylinder 40 is ignited via in each case one spark plug 50 per cylinder 40, spark plugs 50 being also activated by engine control 25 with respect to their ignition timing. The exhaust gas created by the combustion of the air/fuel mixture is exhausted via an exhaust branch 55. A rotary speed sensor 60 is situated in the area of cylinder 40, which records the speed of internal combustion engine 1 in a manner known to one skilled in the art, and passes on the measured value to engine control 25. Furthermore, a speed sensor 65 is provided which, in a manner known to one skilled in the art, records the driving speed of the vehicle and passes on the measured value to engine control 25. Furthermore, according to FIG. 1, an inclination sensor 70 is provided in which, in a manner known to one skilled in the art, the inclination of the vehicle with respect to the horizontal is recorded and the measured value is passed on to engine control 25.

Moreover, an operating element, in this case an accelerator, is provided whose degree of operation or pedal angle is recorded by an accelerator module 10, to be forwarded to engine control 25 as well. In addition, a brake pedal is provided whose degree of operation is detected by a brake pedal module 20 and is likewise forwarded to engine control 25. Optionally, and as shown in FIG. 1, it may further be provided that engine control 25 receives data from a navigation unit 95. Also optionally, and as shown in FIG. 1, engine control 25 may be connected to a vehicle speed controller 165, especially an adaptive cruise control. Moreover, optionally, and as shown in FIG. 1, signals from an image processing unit 170 may be supplied to engine control 25. An output variable of internal combustion engine 1, in particular a torque or power output, are passed on via a gear unit 199, not shown in FIG. 1, having a gear ratio ü, to the driven wheels of the vehicle. In the following, it will be assumed, for example, that the output variable of the internal combustion engine is a torque mi. According to FIG. 1, gear unit 199 is controlled by a gear unit control 175 in a manner known to one skilled in the art, gear unit control 175 exchanging signals with engine control 25 via an interface 196, which may be designed, for example, as a CAN bus.

According to the present invention, it is now provided that, in an overrun condition of drive unit 180 of the vehicle, driving situations in which a high engine braking torque or a low engine braking torque is desired are distinguished. In general, at least two preset driving strategies are prespecified in engine control 25 for the overrun condition, in the overrun condition one of these prespecified driving strategies being selected to be put into use as a function of the current driving situation, after releasing the accelerator. As a function of the detected driving situation, the driving strategy appropriately specified for this driving situation is then selected by engine control 25 and put into use.

Figure 5:
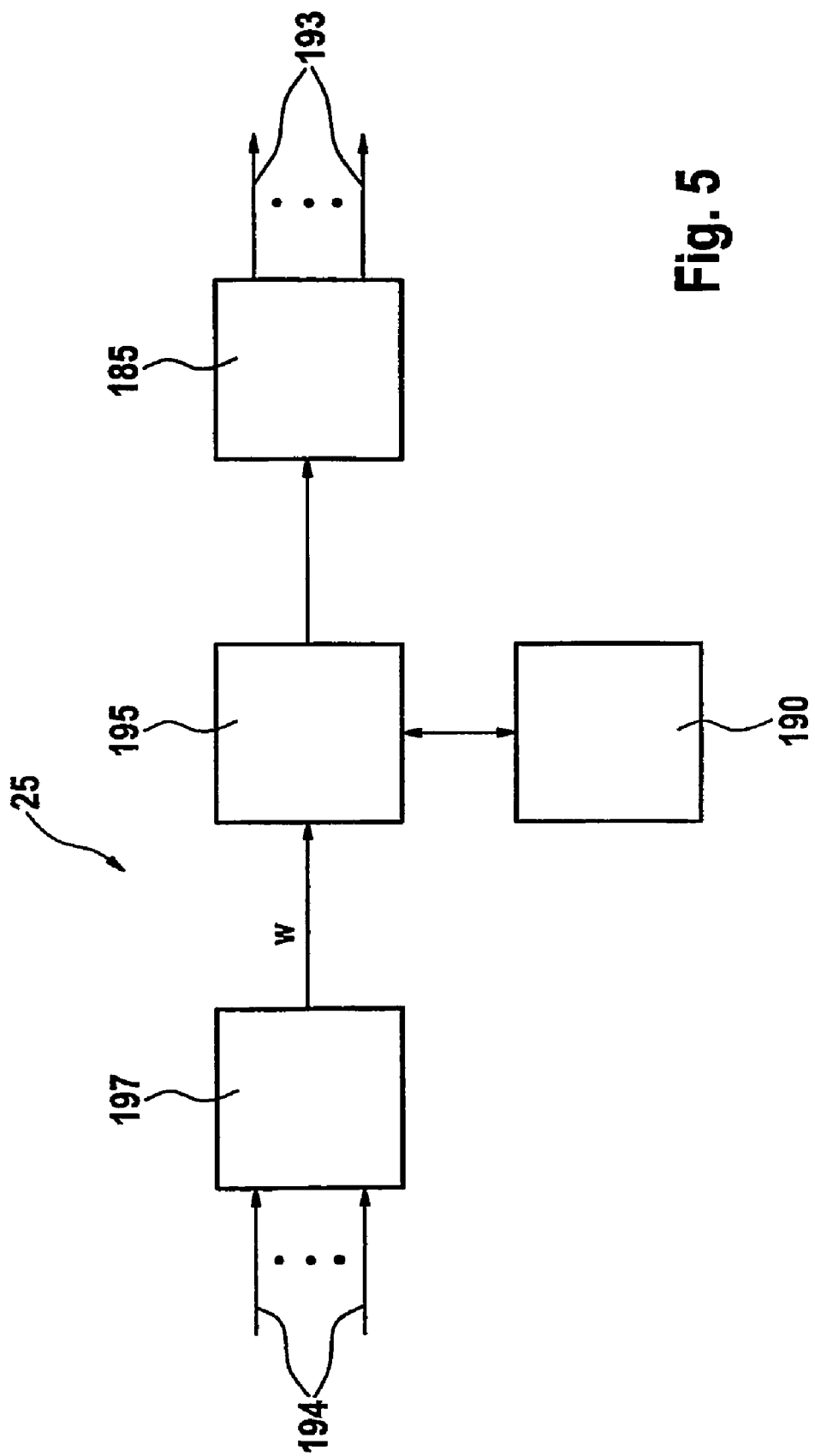
FIG. 5 shows a block diagram for the selection of a desired driving strategy.

According to the present invention, taking into consideration the probable driver command, it is provided that one arrive at as optimal a decision as possible between minimum torque, that is, optimal deceleration, good rolling behavior and low fuel consumption of the vehicle. For this purpose, as shown in FIG. 5 as a block diagram, engine control 25 may include means of ascertaining probability 197, which has input variables supplied to it. In this context, according to FIG. 1, these input variables are signals supplied to engine control 25 by rotary speed sensor 60, by accelerator module 10, by brake pedal module 20, by gear unit control 175, by speed sensor 65, by inclination sensor 70, by navigation unit 95, by adaptive cruise control 165 and/or by image processing unit 170. As will be further explained below, probability ascertainment unit 197 ascertains from these variables a probability value W, which is passed on to means of selection 195. Means of selection 195 are also connected to specification means 190, in which the specified preset driving strategies are stored in assignment to one area at a time for the probability value W. Depending on which probability value means of selection 195 receive, means of selection 195 select the specified driving strategy assigned to this probability value W from specification means 190, and pass it on to setting means 185. Setting means 185 then put into use the selected driving strategy with the aid of actuating variables 193. As far as the actuating variables are concerned, the air supply to internal combustion engine 1, the ignition angle, the fuel supply to internal combustion engine 1 and/or a gear ratio may be involved. In this context, the air supply is put into use with the aid of throttle valve 5, the ignition angle with the aid of spark plugs 50, the fuel supply with the aid of fuel injectors 45 and the gear ratio with the aid of gear control 175, in a manner known to one skilled in the art.

In the following, let us assume, for example, that one is able to select from two prespecified, preset driving strategies for the overrun condition. On the one hand, this is a first driving strategy, using which the vehicle is to be decelerated, and on the other hand a second driving strategy, using which a rolling of the vehicle is desired, as far as possible without braking action.

In a so-called firing overrun condition, the accelerator is released, the vehicle rolls, but overrun fuel cutoff, that is, the interruption of the fuel supply, is not permitted. The reason for this is found, for instance, in too low an engine speed, or the reason may be the protection or heating up of a catalyst in exhaust branch 55, not shown in FIG. 1, active diagnostic functions, and so forth. From the setting of operating elements of the vehicle, such as the accelerator and/or the brake pedal, or from other vehicle data which may originate, for instance, from rotary speed sensor 60, from gear unit control 175, from speed sensor 65, from inclination sensor 70, from adaptive cruise control 165, from navigation unit 95 and/or from image processing unit 170, in response to an accelerator that is released and a rolling vehicle, probability value W is ascertained by probability ascertaining means 197, and it is interpreted, in this context, whether it is more probable that the first driving strategy should be selected, that is, that a stopping command by the driver is present, or whether it is more probable that rolling of the vehicle is desired, as far as possible without braking action.

For the case in which selection means 195 select the first driving strategy, in which the vehicle is to be decelerated in the best way possible in order to stop the vehicle as well as possible, by the appropriate activation of throttle valve 5 an air quantity, to be supplied to internal combustion engine 1, that is as low as possible may be set, which follows from the minimum possible from a combustion technology point of view and from the criterion of the stability of an idling speed control of drive unit 180, as well as from a required torque reserve that is to be formed if necessary for reasons of idling speed regulation. However, no increase beyond this value takes place of the air quantity to be supplied to internal combustion engine 1. The deceleration command of the driver is supported in this manner. The fuel supply is set, in this context, by the appropriate activation of fuel injectors 45, so as to maintain a prespecified value for the air/fuel mixture ratio. Based on the minimal air quantity, in this context, a minimal fuel usage also comes about.

Optionally, the ignition angle may also be set to its latest possible value. The air/fuel mixture in cylinder 40 is thereby combusted at poor efficiency, whereby the deceleration command of the driver is further supported. In vehicles having automatic transmissions, in a paradoxical way, fuel may even be saved, in spite of the poor efficiency. On account of the torque-converter slip, the engine speed drops off because of the low torque. If the charge of cylinder 40 per power cycle is held constant, the throughput of the air/fuel mixture through cylinder 40 per time unit is reduced because of the low engine speed, and with that the fuel usage is also reduced. The poor efficiency of the combustion because of the delayed ignition angle is not of any consequence if an actual deceleration command of the driver is assumed. At a better efficiency, the driver would compensate for this by a stronger operation of the brake pedal.

In the case of a Diesel engine, the first driving strategy may be implemented by reducing the fuel supply to internal combustion engine 1 by the appropriate control of fuel injectors 45, instead of by reducing the air supply to internal combustion engine 1.

If means of selection 195 select the second driving strategy, according to which the vehicle is to roll in the overrun condition at as low a braking action as possible, perhaps even without braking action, this may be implemented by setting means 185 in that the ignition angle is set to a value having as high as possible an efficiency, preferably to the optimal value. In this context, in comparison to the first driving strategy, the ignition angle is reset to early. If necessary, a somewhat lesser efficiency could be set by retardation of the ignition angle if, for example, at a very low engine speed, the idling control requests a torque reserve, or when this is requested because of the heating of the catalyst or based on active diagnosis functions. But even in these cases, the ignition angle efficiency should, as a rule, be higher than in the case of the first driving strategy, with the ignition angle set as late as possible. The high ignition angle efficiency supports the rolling command of the driver and takes care that the energy that is present in the fuel is converted optimally into kinetic energy of the vehicle. This makes for minimal fuel usage.

In such a case, one may also optionally deviate from the minimal air quantity to internal combustion engine 1 that was described in connection with the first driving strategy, and also, if the accelerator is released, one may set a somewhat higher air supply, and thereby a higher fuel quantity supplied to internal combustion engine 1, to maintain a prespecified value for the air/fuel mixture ratio. In this way, inner engine torque mi is even increased as output variable of drive unit 180. This additionally supports the driver's rolling command. If it is assumed that there actually does not exist a deceleration command but rather a rolling command by the driver, this does not act to increase usage. Without the increase in air quantity, the driver would have to step on the accelerator again earlier in order to keep up the rolling of the vehicle at the desired speed.

In the following we shall describe how one may distinguish between a deceleration command and a rolling command by the driver. In this context, the simplest possibility is to assume a deceleration command if the brake pedal is being operated, and to assume a rolling command if the brake pedal is not being operated. Alternatively or additionally one may conclude on a deceleration command if the accelerator is released very rapidly, whereas if the accelerator is let go comparatively slowly, a rolling command is assumed. Additionally or alternatively one may conclude on a deceleration command if the driver has undertaken a down-shifting of the transmission 199 within a prespecified time before the activation of the overrun condition, or is driving using a low gear as measured by the travel speed or, in the case of an automatic transmission, has set a different setting for the selector lever than "drive" or "D". Additionally or alternatively, a deceleration command may also be assumed if there is a steep downhill grade on the currently traveled roadway. The uphill grade or the downhill grade may be ascertained, in a manner known to one skilled in the art, by comparing the wheel torque and the wheel acceleration. In addition or alternatively, data may be incorporated from driver assistance systems, such as, in the case of adaptive cruise control 165, the distance from a preceding vehicle or the speed of approach of a preceding vehicle. Additionally or alternatively, data may also be incorporated from navigation unit 95, in which, for instance, one concludes on a deceleration command before sharp curves or before crossroads.

Figure 7:
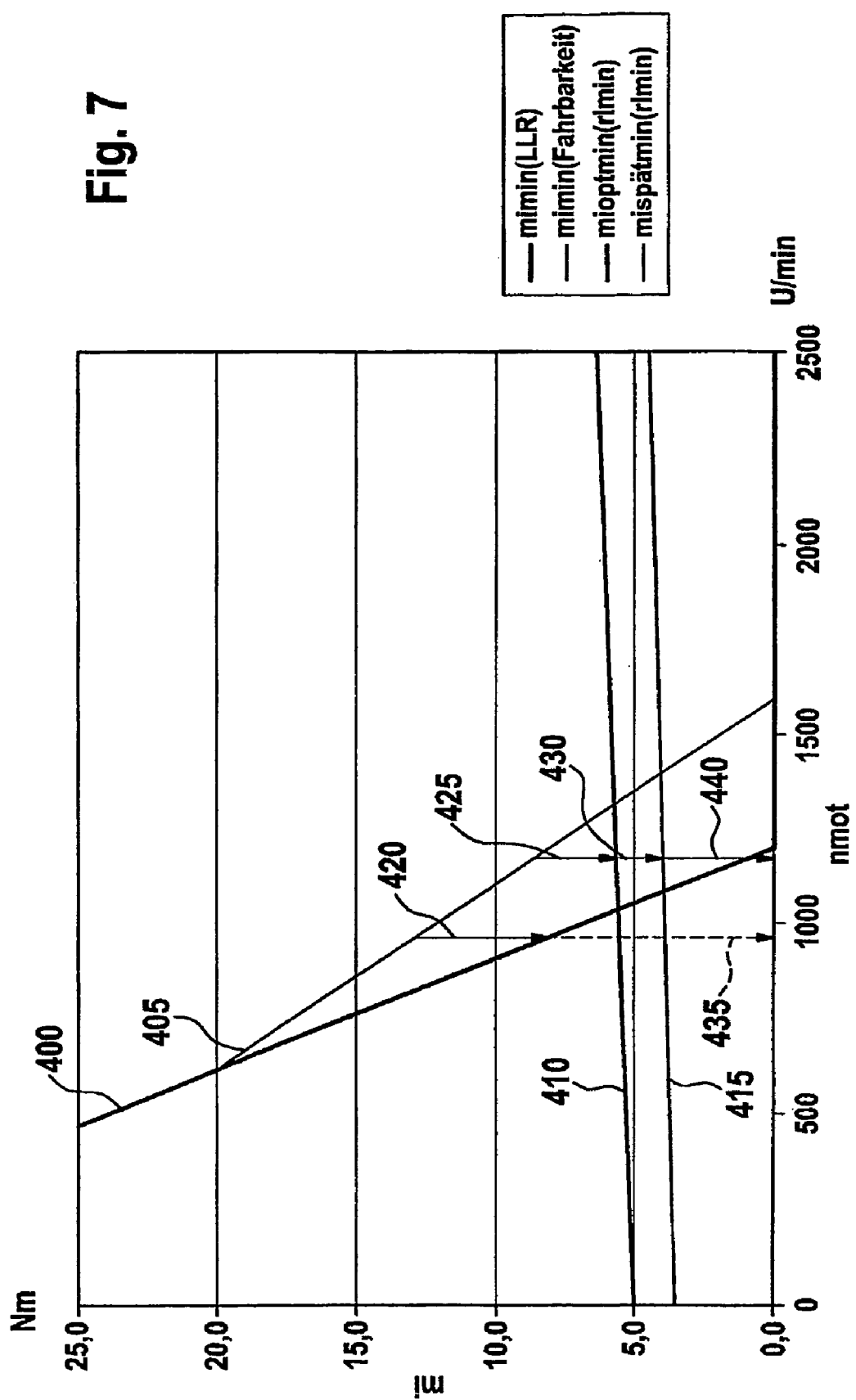
FIG. 7 shows a diagram of a torque of a drive unit of a vehicle plotted against an engine speed of the drive unit, to make clear the functioning manner of the method according to the present invention and the device according to the present invention.

FIG. 7 shows a diagram of output torque mi of internal combustion engine 1 plotted against engine speed nmot. Output torque mi of internal combustion engine I is also designated as inner torque or inner engine torque. The diagram shown in FIG. 7 illustrates the effect of the selection of one of the two driving strategies on the relationship of inner torque mi and engine speed nmot, or rather shows the play for this relationship in response to the selection of one of the two driving strategies. The line that is marked by reference numeral 400 in the diagram according to FIG. 7 symbolizes the minimum inner engine torque mi which may be set for reasons of control-technological stability of the idling control. The line that is marked by reference numeral 405, which, up to an engine speed nmot of about 600 revolutions per minute, at which an inner torque mi of approximately 20 nm is reached, is equivalent to line 400, and for greater engine speeds nmot deviates towards greater inner torques mi, symbolizes a minimum inner engine torque mi with respect to the drivability of the vehicle. Engine torque mi of line 405, which is increased compared to line 400, is used for reducing the vehicle deceleration when the accelerator is released, in order to achieve a more comfortable travel behavior at low speeds. In addition to that, the minimum value, raised in this manner compared to line 400, improves the start-up behavior of the vehicle at low accelerator operation. When starting up the vehicle, if, for example, one specifies an accelerator setting of 5%, then, at an assumed, for instance, linear scaling, internal combustion engine 1 sets an inner engine torque mi which, with respect to the torque lift of 5% that is able to be set above the engine speed-dependent minimum inner engine torque mi as shown in FIG. 7, lies along line 400. Engine speed nmot rises during the start-up procedure. Now, if the minimum value of inner engine torque mi drops off very steeply according to line 400 at increasing speed nmot, then, of course, inner engine torque mi, set based on the accelerator operation of 5%, drops off correspondingly steeply. In this context, this inner engine torque mi corresponds to the sum of the minimum value of inner engine torque mi according to line 400, that is assigned to current engine speed nmot, plus 5% with respect to the torque lift that is able to be set at maximum, that is 100%, operation of the accelerator. Consequently, when the vehicle starts up, it so-to-speak cuts off inner engine torque mi itself. When line 405 is used for engine speeds above about 600 revolutions per minute, this behavior becomes much milder because in this speed range, line 405 makes available a greater inner engine torque mi than line 400.

Consequently, line 400 is limited only by the stability of the idling control, whereas line 405 is limited by the characteristic operation of the accelerator by the driver that occurs in the usual way during start-up, With regard to as comfortable as possible a driving behavior at low speeds. In this context, for example, one may apply line 405 on a test stand and store it in engine control 25.

Line 410 results from not being able to make the air quantity supplied to internal combustion engine 1 as small as desired. First of all, throttle valve 5, as a rule, is not tight enough to make this possible, and secondly, an intake manifold pressure that is too low based on too low an air quantity supplied to internal combustion engine I may also lead to oil being drawn through sealing rings into the combustion chamber of cylinder 40, which thus creates the famous "blue smoke". For this reason, for example, a threshold is applied on the test stand which specifies a speed-dependent minimum air quantity. In the firing operation of internal combustion engine 1 there follows from this a minimum fuel quantity, at a specified value for the air/fuel mixture ratio, which in turn, assuming an optimal ignition angle, results in the curve of inner torque mi according to line 410 plotted against speed nmot.

However, by setting an ignition angle that is later than the optimal ignition angle, engine control 25, even at a minimum air quantity, is able to set an inner torque mi that is reduced compared to inner torque mi according to line 410. At the latest possible ignition angle, the result, in this context, is a curve of inner torque mi plotted against speed nmot according to line 415, which, compared to line 410, generates lower inner torques mi over the entire speed range. Lines 410 and 415 may also be applied appropriately, for example, on a test stand, and stored in engine control 25.

The following operating strategy for drive unit 180 is recommended in response to a released accelerator, depending on whether a deceleration command or a rolling command by the driver is assumed:

In the case of a rolling command by the driver, which exists with great probability, an inner engine torque mi is set which, as a function of engine speed nmot follows line 405, and thus the minimum inner engine torque mi with regard to drivability. In this context, the ignition angle is set to the optimal efficiency, if possible, this efficiency being lowered, if necessary, by setting the ignition angle late, in order to make available required torque reserves.

If the probability of a rolling command by the driver is lower, so that the rolling command by the driver can no longer be quite certainly assumed, one may set an inner engine torque mi, according to the arrows in FIG. 7 marked with reference numerals 420, 425, which comes about from the maximum of line 400 and line 410 at the given current engine speed nmot. Thus, in the case of arrow 420 at an engine speed nmot of about 950 revolutions per minute, the maximum of line 400 and line 410 is to be found on line 400, so that with inner engine torque mi present at this engine speed driving is on line 400, whereas in the case of arrow 425, at an engine speed nmot of about 1200, the maximum lies on line 411, so that in this case driving is done using inner engine torque mi according to line 410. The ignition angle is preferably set in such a way that the optimal ignition angle efficiency comes about, except for possibly required torque reserves. In this way, it is true that a greater deceleration of the vehicle is set than in the above-described case of the rolling command that is present at a high probability, but a lower deceleration than in the case described immediately below. In any case, by setting the optimal ignition angle, no fuel is wasted.

If, on the other hand, one may conclude with greater certainty on a deceleration command by the driver, for instance when the brake has been stepped on, then according to arrow 430, in the example of engine speed nmot of about 1200 revolutions per minute, a still lower inner torque or inner engine torque mi in comparison to the previous case is set, according to the maximum from line 415 and line 400. In this context, the maximum lies on line 415, in this case, and corresponds to the latest possible value for the ignition angle at the least air quantity specified for this engine speed.

An actual overrun fuel cutoff by the interruption of the fuel supply to all the cylinders of internal combustion engine 1 is shown for the two engine speeds nmot looked at in exemplary fashion in FIG. 7, with the aid of arrows 435, 440, according to which inner engine torque mi is then brought back to zero. In this context, this overrun fuel cutoff can also take place by successive cutoff of the fuel supply to the individual cylinders of internal combustion engine 1, in so-called reducing steps.

The condition for such an overrun fuel cutoff will be explained later.

Figure 6:
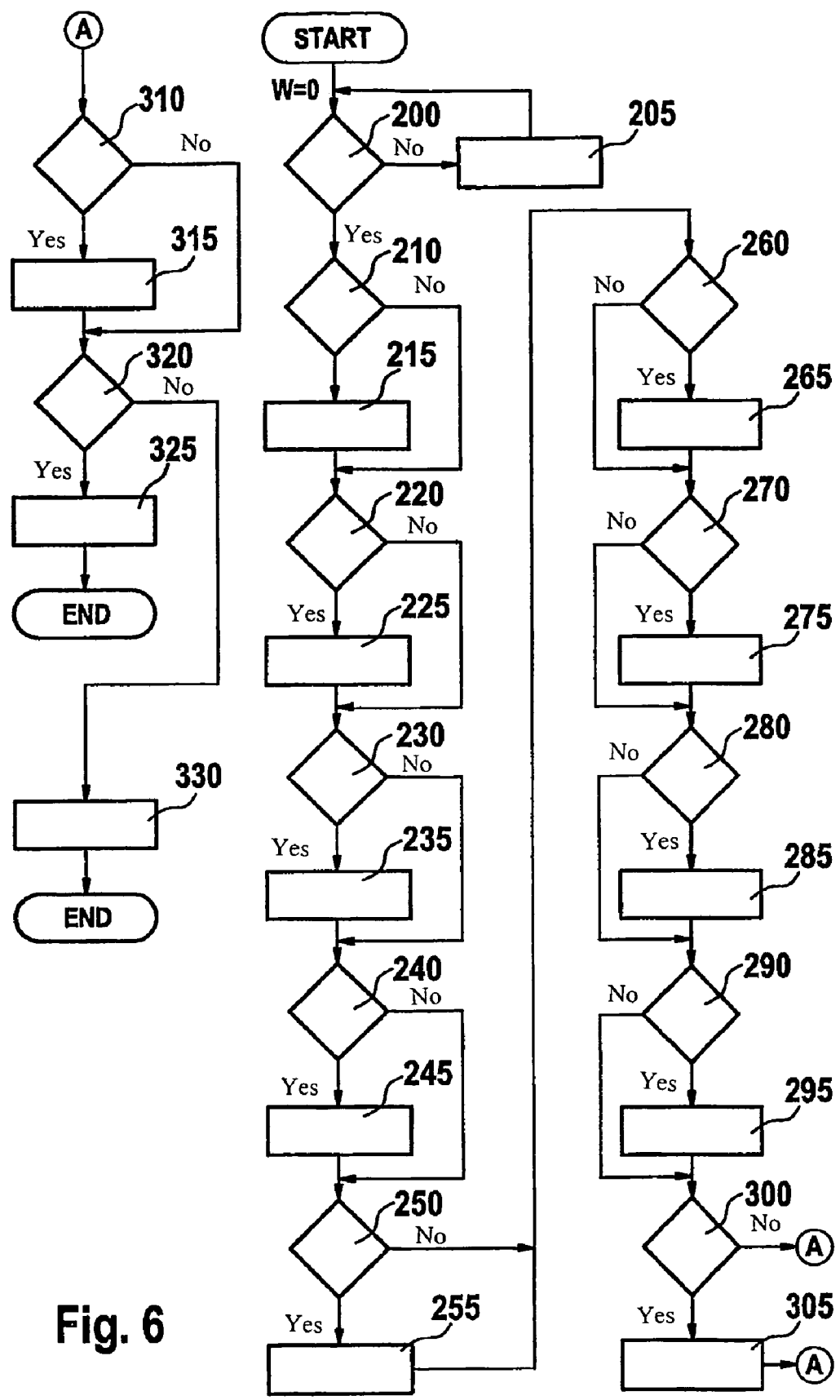
FIG. 6 shows a flow chart for the selection of a desired driving strategy.

Now, FIG. 6 shows a flow chart for an exemplary sequence of the method according to the present invention, in which, as was described, two driving strategies, namely, deceleration of the vehicle and the rolling of the vehicle are prespecified in means of specification 190. After the start of the program, a probability value W is set to zero. Probability value W indicates at what probability the first driving strategy is to be selected, that is, at what probability a driving situation is present according to which the driver of the vehicle wishes to decelerate the vehicle. The probability for the second driving strategy, according to which the vehicle is to roll using as little braking action as possible, may then be ascertained by subtraction of this probability value W from the value 1. At a program point 200, engine control 25, in the light of the signals of accelerator module 10, tests whether an overrun condition is to be set. If yes, the program branches to a program point 210, and otherwise to a program point 205. In this context, engine control 25 is able to recognize from the release of the accelerator that an overrun condition should be set.

At program point 210, probability ascertaining means 197, in the light of the signal of brake pedal module 20 tests whether the brake pedal has been operated since the accelerator was let go. If this is the case, the program branches to a program point 15, and otherwise to a program point 220.

At program point 215, probability ascertaining means 197 add to probability value W a first value X1 in order to form a new probability value W. Then the program branches to program point 220. At program point 220, probability ascertaining means 197 test whether the gradient of a variable, derived from the operation of the accelerator at the release of the accelerator, falls below a prespecified threshold value. If this is the case, the program branches to a program point 225, otherwise the program branches to a program point 230. The variable derived by the operation of the accelerator may, for example, be the degree of operation of the accelerator. It is communicated to probability ascertaining means 197 by accelerator module 10. The specified threshold value for the gradient is preferably a negative value, because when the accelerator is released, the gradient of the operation of the accelerator is negative in any case. This specified threshold value may be selected, in this context, on a test stand, for instance, suitably in such a way that a meaningful and reliable distinction between a deceleration command and a rolling command by the driver is made possible.

At program point 225, probability ascertaining means 197 add to currently present probability value W a second value X2, in order to form a new probability value W. Thereafter, the program branches to program point 230.

At program point 230, probability ascertaining means 197, in the light of the signal of rotary speed sensor 60 and the signal of speed sensor 65, test whether the ratio of the engine speed to the vehicle speed nmot/v is currently falling below a prespecified threshold value. If this is the case, the program branches to a program point 235, otherwise the program branches to a program point 240.

The specified threshold value may also be selected, in this case, on a test stand, for instance, suitably in such a way that a distinction between the deceleration command and a rolling command by the driver is also reliably made possible. The greater the engine speed in relationship to the vehicle speed, the earlier it may be concluded that the driver gave a deceleration command. The lower the engine speed in relation to the vehicle speed, the earlier it may be concluded that the driver gave a rolling command.

At program point 235, probability ascertaining means 197 add a third value X3 to the current value W for the probability, in order to form a new value W for the probability. Thereafter the program branches to program point 240.

At program point 240, probability ascertaining means 197 test whether a transmission downshifting was reported by transmission control 175, within a predefined time before the release of the accelerator. If this is the case, the program branches to a program point 245, otherwise the program branches to a program point 250. The predefined time may be selected in this case, for example, in such a suitable way that a transmission downshifting carried out within this predefined time may be reliably recognized within the meaning of a deceleration command by the driver for the subsequent overrun condition. If the transmission downshifting took place longer ago than the predefined time, a connection between the transmission downshifting and the subsequent overrun condition can no longer be established.

At program point 245, probability ascertaining means 197 add a fourth value X4 to the current probability value W, in order to form a new probability value W. Thereafter the program branches to program point 250.

At program point 250, probability ascertaining means 197 test whether currently, in case of an automatic transmission, the position of the selector lever, or an operating element corresponding to it, is in a different position than "drive" or "D". If this is the case, the program branches to a program point 255, otherwise the program branches to a program point 260. If the selector lever is in a different setting from "drive" or "D", a deceleration command by the driver may be assumed. At program point 255, probability ascertaining means 197 add a fifth value X5 to the current probability value W, in order to form a new probability value W. Thereafter the program branches to program point 260.

At program point 260, probability ascertaining means 197 test, in the light of inclination sensor 70, whether the inclination of the vehicle with respect to the horizontal currently exceeds in absolute quantity a prespecified threshold value. If this is the case, the program branches to a program point 265, otherwise the program branches to a program point 270. In this context, the prespecified threshold value may be specified in such a way that a deceleration command by the driver may be reliably distinguished from a rolling command. If, in this context, the inclination of the vehicle is greater in absolute quantity than the predefined threshold value, a deceleration command may be assumed, based on the downhill slope that is present. On the other hand, if the inclination is less in absolute quantity than the prespecified threshold value, it is assumed that the driver wishes to roll in overrun condition.

At program point 265, probability ascertaining means 197 add a sixth value X6 to the current value W for the probability, in order to form a new value W for the probability. Thereafter the program branches to program point 270.

At program point 270, probability ascertaining means 197 test, in the light of the signals of adaptive cruise control 165 and, in that place, particularly in the light of a distance sensor, whether the distance from a preceding vehicle currently falls below a prespecified threshold value. If this is the case, the program branches to a program point 275, otherwise the program branches to a program point 280. In this context, the prespecified threshold value may be selected in such a way that, once again, a distinction may reliably be made between a deceleration command and a rolling command of the driver. The shorter the distance from the preceding vehicle, the earlier a deceleration command may be assumed. Thus, if the distance from the preceding vehicle is less than the prespecified threshold value, a deceleration command is assumed, and otherwise a rolling command.

At program point 275, probability ascertaining means 197 add a seventh value X7 to the current value W for the probability, in order to obtain a new value W for the probability. Thereafter the program branches to program point 280.

At program point 280, probability ascertaining means 197 test, in turn, in the light of distance sensors of adaptive cruise control 165, whether the derivation with respect to time of the distance from the preceding vehicle, that is, the approach speed to the preceding vehicle currently exceeds a prespecified threshold value. If this is the case, the program branches to a program point 285, otherwise the program branches to a program point 290. The prespecified threshold value is selected, in this case, to be equal to zero or positive, in order to distinguish the deceleration command of the driver from his rolling command. At a negative approach speed, or an approach speed below the prespecified threshold value, it is assumed that the driver wishes to roll, otherwise a deceleration command by the driver is assumed.

At program point 285, probability ascertaining means 197 add an eighth value X8 to the current value W for the probability, in order to obtain a new value W for the probability. Thereafter the program branches to program point 290.

At program point 290, probability ascertaining means 197 test, for example, in the light of the signal of image processing unit 170, whether the camera is currently detecting an obstacle on the roadway. If this is the case, the program branches to a program point 295, otherwise the program branches to a program point 300. Upon detection of the obstacle, a deceleration command of the driver is assumed, otherwise a rolling command. In this context, image processing unit 170 includes, for example, a camera that takes the range of the driver's view and forwards it to a processing unit, for the detection of obstacles. If image processing unit 170 detects an obstacle on the roadway in the light of the camera signal, this is then communicated to probability ascertaining means 197 by a corresponding signal.

At program point 295, probability ascertaining means 197 add a value X9 to the current value W for the probability, in order to form a new value W for the probability. The program subsequently branches to program point 300.

At program point 300, probability ascertaining means 197 test, in the light of the signals supplied by navigation unit 95, whether the vehicle is currently approaching a curve. If so, the program branches to a program point 305; otherwise the program branches to a program point 310. In this context, navigation unit 95 ascertains the current position of the vehicle, in a manner known to one skilled in the art, and compares it to stored map data, so that it may be established whether the vehicle is currently approaching a curve. This information is communicated to probability ascertaining means 197. If the vehicle is currently approaching a curve, a deceleration command of the driver is assumed, and otherwise a rolling command.

At program point 305, probability ascertaining means 197 add a value X10 to current value W for the probability, in order to form a new value W for the probability. The program subsequently branches to program point 310. The test at program point 300, as to whether the vehicle is currently approaching a curve, may also take place starting from the receipt of the signal of image processing unit 170 by probability ascertaining unit 197, since image processing unit 170 is also able to ascertain, in the manner described, whether a curve is appearing within the view of the driver.

At program point 310, probability ascertaining means 197 test, in the light of navigation unit 95 or image processing unit 170, whether the vehicle is currently approaching an intersection or a junction. If so, the program branches to a program point 315; otherwise the program branches to a program point 320. The approach to the intersection or the junction is recognized, in this context, by navigation unit 95 or image processing unit 170 in the manner already described with regard to curve detection.

If the vehicle approaches an intersection or a junction, this leads to concluding on a deceleration command, and otherwise a rolling command.

At program point 315, probability ascertaining means 197 add a value X11 to current probability value W, in order to form a new probability value W. The program subsequently branches to program point 320.

At program point 320, selection means 195 test whether probability value W is greater than a prespecified threshold value. If so, the program branches to a program point 325; otherwise the program branches to a program point 330. In this context, threshold value S is selected in such a way that a probability value W above threshold value S sufficiently reliably indicates a deceleration command, and a probability value W below threshold value S sufficiently reliably indicates a rolling command.

Thus, at program point 325, at selection means 195, the first driving strategy is selected, and put in action in the manner described. The program is then ended.

At program point 330, selection means 195 select the second driving strategy, and put it into operation in the manner described. The program is then ended.

Alternatively, and as shown in the example as in FIG. 7, it may also be provided to separate from one another more than two probability ranges, as in FIG. 6, by a threshold value S. According to FIG. 7, three probability ranges are required, namely, a first probability range in which, at a high probability value W, such as above a first threshold value S1, a rolling command of the driver is assumed, at a probability value W below a second threshold value S2, that is smaller than first threshold value S1, a deceleration command of the driver is assumed. If probability value W is between first threshold value S1 and second threshold value S2, then according to arrows 420, 425 a driving situation is recognized that lies between an explicit rolling command and an explicit deceleration command, and which, for example, according to arrow 425 leads to setting an inner engine torque mi, which at the current engine speed nmot lies below line 405 and above line 415, namely on line 410. More than three probability ranges and driving situations assigned to these probability ranges may also be provided, having corresponding effect on the setting of inner engine torque mi, and thus of the actuating variables described.

In the exemplary embodiment according to FIG. 6, it is provided that the sum of X1+X2+X3+ . . . +X11 yields the value 1. In this context, the individual values X1, X2, X3, . . . , X11 may be of completely different sizes, depending on how certainly the presence of the one or the other criterion speaks for a deceleration command or a rolling command of the driver. Thus, for example, it may be provided that the value X1 of the operation of the brake pedal be designed as the largest of the values X1, X2, X3, . . . , X11, for instance, to make it 0.5 or 0.55, since the operation of the brake pedal emphasizes most clearly a deceleration command of the driver. Threshold value S may, for instance, be selected equal to 0.5.

As an additional criterion for the determination of the current driving situation after releasing the accelerator, analogous to the gradient of the variable derived from the operation of the accelerator, the gradient of a variable derived from a prespecification for the output variable of drive unit 180, in the present example the inner engine torque mi, may also be used. Thus, vehicle functions may be provided which are not shown in FIG. 1, for the sake of clarity, and which give off such a prespecification for inner torque mi of internal combustion engine 1 to engine control 25 for putting into action. In the case of these vehicle functions, for example, an antilock brake system, a traction control system, a vehicle dynamics control or the like may be involved. If, for example, a rapid cancellation of the inner engine torque mi is requested by the driving dynamics control, this may likewise be interpreted as a deceleration command. Consequently, in the flow chart according to FIG. 6, an additional query may be provided of the form as to whether the gradient, requested by such a vehicle function, of the variable derived from a prespecification for inner engine torque mi, preferably as to whether the gradient of the prespecification for inner engine torque mi itself, falls below a prespecified threshold value. In this case, the deceleration command is recognized, and otherwise the rolling command. The prespecified threshold value is negative in this context, as also in the case of the gradient of the accelerator operation, and is so suitably selected that the deceleration command is able to be distinguished reliably from the rolling command. The specification for inner engine torque mi does not necessarily have to originate from a vehicle function, but may stem from the accelerator module itself, in the form a driver command torque derived from the degree of operation of the accelerator. The prespecified threshold value for the gradient of the variable, derived from the specification of the output variable of drive unit 180, may also be suitably applied, for example, on a test stand.

In this context, in turn, a value X12 is assigned to the corresponding criterion for the formation of the value W of the probability.

In addition, as the criterion for the actually present driving situation after release of the accelerator, it may be tested whether the quotient of current gear ratio ü and current vehicle speed v, that is, ü/v undershoots a prespecified threshold value. In this case it is assumed that a deceleration command is present, and otherwise a rolling command is assumed. The prespecified threshold value should, in this case, be preferably selected so that a reliable distinction between deceleration command and rolling command is possible. For this purpose, the threshold value may be applied in a suitable manner on a test stand, for instance.

The lower gear ratio ü is, in comparison to vehicle speed v, the earlier a deceleration command by the driver is recognized, in this context, and the greater gear ratio ü is in comparison to vehicle speed v, the earlier a rolling command by the driver is assumed. A corresponding value X13 may also be assigned to this criterion, for probability value W.

Gear ratio ü is communicated to engine control 25, and therewith to probability ascertaining means 197 via transmission control 175 and vehicle speed v via speed sensor 65.

When all the criteria mentioned are used, the sum of X1+X2+X3, . . . , X13 consequently yields the value 1.

Using the aforementioned actuating variables air supply, fuel supply and ignition angle, setting means 185 set inner engine torque mi as output variable of drive unit 180, corresponding to the established driving strategy, such as the procedure sketched in FIG. 7.

Alternatively, or in addition to the actuating variables named, the deceleration command or the rolling command of the driver may also be supported by the setting of a suitable gear ratio ü, on the part of gear control 175.

In this context, in the case of a deceleration command, downshifting may take place, that is, gear ratio ü may be reduced, and in the case of a rolling command, gear ratio ü may be increased, that is, upshifting.

Quite generally, in order to set the output variable of drive unit 180 according to the selected driving strategy, one or more of the actuating variables air supply, fuel supply, ignition angle and gear ratio may be selected. Since the gear ratio does not have an effect on inner engine torque mi, in the case of using gear ratio ü as an actuating variable, the previously made observations, especially in connection with FIG. 7, for instance, for the output variable of the wheel torque of drive unit 180 should be applied analogously.

Furthermore, it may be provided that, independently of the driving strategy chosen, in response to the detection of a fault on a safety-relevant component of the vehicle or drive unit

180, such as on the brake system, the air supply is reduced and/or the ignition angle is shifted in the direction late and/or the fuel supply is reduced and/or the gear ratio is reduced. In this way, the vehicle may be decelerated and stopped, if necessary, for the sake of safety.

Moreover, it may be provided also to specify a threshold value, as a function of the current driving situation, for an operating variable of drive unit 180, above which the fuel supply is totally interrupted, and thus a complete overrun fuel cutoff is implemented. This operating variable of drive unit 180 may preferably be engine speed nmot. Thus, if the first driving situation is present, which leads to the selection of the first driving strategy, that is, if the deceleration command is present, a first predefined threshold value for the engine speed at a low value may be selected, as is the case if the second driving situation is present, that is, the rolling command, which leads to the selection of the second driving situation. Consequently, the complete overrun fuel cutoff takes place, in the case of the deceleration command, already at lower engine speeds than if the rolling command is present.

Correspondingly, it may be provided that a second prespecified threshold value for the operating variable of the drive unit is selected for reinstating the fuel supply after the complete overrun fuel cutoff, as a function of the current driving situation, after releasing the accelerator. Again, the engine speed may preferably be used in this instance. Thus, it may, for example, be provided that, if the first driving situation is present, that is, the deceleration command, the second prespecified threshold value for the engine speed, below which the fuel supply is resumed again after previous interruption, is at a lower value than is the case for the second driving situation, that is, the rolling command. Consequently, in the case of the presence of the deceleration command after releasing the accelerator, the fuel supply is resumed only in response to the dropping off of the engine speed to a lower value than is the case for the presence of the rolling command, that is, the second driving situation.

The first prespecified threshold value for the engine speed and the second prespecified threshold value for the engine speed may, for example, be suitably applied on a test stand, in this context, so that the complete overrun fuel cutoff by interrupting the fuel supply and the resumption of the fuel supply after the previous interruption may be adjusted optimally to the currently present driving situation, that is, they optimally support the current driving situation, and therewith the selected driving strategy. In the case of the presence of a deceleration command, this is achieved in that the complete interruption of the fuel supply takes place already at lower engine speeds than at the presence of the rolling command, and in that the resumption of the fuel supply, after a previous interruption, during the presence of the deceleration command and at decreasing engine speed, only sets in again at a lower engine speed than is the case in the presence of the rolling command.

In the following, the method according to the present invention and the device according to the present invention will be explained in exemplary fashion for the case in which the single actuating variable air supply is used for putting into place a driving situation-dependent driving strategy after the accelerator is released.

In general, the specific embodiment described in the following is a method for operating a vehicle using internal combustion engine 1, in which the air supply to internal combustion engine 1 is set via actuator 5, that is, in this example, the throttle valve, and in the overrun condition of internal combustion engine 1, the degree of opening of actuator 5 is set as a function of a driving situation. In this context, as described, it may be provided that the driving situation is ascertained by evaluating the gradient of a variable derived from the operation of the accelerator. In this case, if the gradient falls below a specified threshold value, the degree of opening of actuator 5 is reduced in the direction of the closed position of actuator 5, and, if a gradient is above the specified threshold value, the degree of opening of the actuator 5 is increased in the direction of complete opening of the actuator 5. Alternatively, it may be provided that the opening degree of the actuator 5 to be set in the overrun condition or a variable characterizing this degree of opening, is ascertained as a function of the gradient of the variable derived from the actuation of the accelerator, using a characteristics curve or a characteristics map 15.

Additionally or alternatively, the driving situation may be ascertained by the evaluation of the operation of the brake pedal. In this context, it may be provided that, when the brake pedal is pressed, the degree of opening of actuator 5 is reduced in the direction of the closed position of actuator 5, and that when the brake pedal is released, the degree of opening of actuator 5 is increased in the direction of the full opening of actuator 5.

Additionally or alternatively, it may be provided that the driving situation is ascertained by the evaluation of the information about the inclination of the vehicle with respect to the horizontal. In this case, it may be provided that, when the prespecified threshold value is exceeded in absolute value by the inclination, the degree of opening of actuator 5 is reduced in the direction of the closed position of actuator 5, and in the event that the inclination undershoots the absolute value of the prespecified threshold value by the inclination, the degree of opening of actuator 5 is increased in the direction of the fully open position of actuator 5.

Additionally or alternatively, it may be provided that the driving situation is ascertained by the evaluation of the travel speed.

Furthermore, it may optionally be provided, when a fault is detected in a safety-relevant component of the vehicle or in internal combustion engine 1, that the degree of opening of the actuator 5 is reduced in the direction of the closed position of the actuator 5.

According to the present invention, engine control 25 for operating the vehicle having internal combustion engine 1 is provided, in this case, having actuator 5 for setting the air supply to internal combustion engine 1, control unit 30 being provided which, in overrun condition of internal combustion engine 1 sets a degree of opening of actuator 5 as a function of the driving situation.

As a function of the detected driving situation, throttle valve 5 will then be controlled in such a way that the desired engine braking torque is generated, The fuel consumption may thereby be reduced. According to the present invention, it is thus the case that in overrun condition of the vehicle or of combustion engine 1, the degree of opening of throttle valve 5 is adjusted as a function of the instantaneous driving situation.

There are various ways of ascertaining the instantaneous driving situation, as was described.

One possibility is to determine the gradient of a variable derived from an operation of the accelerator. This variable may be the operating degree of the accelerator, or pedal angle wped_w, for example. Hereinafter, it is to be assumed by way of example that the variable derived from the operation of the accelerator is pedal angle wped_w. Therefore, if overrun operation of the vehicle or of internal combustion engine 1 was reached by a rapid release of the accelerator, this indicates that a high engine braking torque is to be set in overrun operation. On the other hand, if the overrun condition of the vehicle or of combustion engine 1 was reached by a slow release of the accelerator, this indicates that a low engine braking torque is to be set in the overrun condition. In the simplest case, it may therefore be provided that a threshold value Swped_w be specified for the gradient of pedal angle wped_w and stored in engine control 25. For this purpose, the threshold value Swped_w may be applied in a suitable manner on a test stand, for instance. Specified threshold value Swped_w is selected as a negative value, in this instance, since a negative time gradient of pedal angle wped_w will come about as well upon release of the accelerator. From pedal angle wped_w of the accelerator, relayed to engine control 25 by accelerator module 10, engine control 25 determines the time gradient of this pedal angle wped_w. If this gradient falls below specified threshold value Swped_w when the accelerator is released, a fast release of the accelerator has occurred and a high engine braking torque is desired. In this case, engine control 25 will control throttle valve 5 in such a way that the degree of opening of throttle valve 5 is reduced in the direction of the closed position of throttle valve 5. This may be achieved, for instance, by closing throttle valve 5 completely, A maximum engine braking torque is generated in this way. If upon release of the accelerator the gradient exceeds specified threshold value Swped_w, a slow release of the accelerator is present and a low engine braking torque desired. In this case engine control 25 will control throttle valve 5 in such a way that the degree of opening of throttle valve 5 is increased in the direction of a full opening of throttle valve 5. This may be accomplished, for instance, by opening throttle valve 5 completely, A minimum engine braking torque is generated in this way. When selecting specified threshold value Swped_w, it must therefore be observed that gradients of pedal angle wped_w above this threshold value Swped_w also correlate only to a driver command of a minimum engine braking torque and that gradients of pedal angle wped_w below this threshold value Swped_w also correlate only to a driver command of a maximum engine braking torque.

According to an alternative specific embodiment, a more refined adjustment of the degree of opening of throttle valve 5 as a function of the driving situation is possible in the overrun condition. Here, the degree of opening of throttle valve 5 to be adjusted, or a variable characterizing this degree of opening, is determined as a function of the gradient of the variable derived from the operation of the accelerator (in this example pedal angle wped_w) using a characteristics curve or a characteristics map. The variable characterizing the degree of opening of throttle valve 5 may be, for example, a setpoint value wped_wsetpoint for the pedal angle, which is proportional to a degree of opening of throttle valve 5, by which setpoint value wped_wsetpoint of the pedal angle can be put in operation in order to implement a corresponding driver command torque. The advantage of the characteristics curve approach is that, for each gradient of pedal angle wped_w, an associated degree of opening of throttle valve 5, or, in this example, an associated setpoint value wped_wsetpoint of the pedal angle may be gathered from the characteristics curve, so that the degree of opening of throttle valve 5 may be set in a more discriminating manner as a function of the gradient of pedal angle wped_w. Of course, it may also be provided that either a fully closed throttle valve 5 or a fully open throttle valve 5 will come about as output variable of the characteristics curve, so that the same result is achieved as in the threshold value approach described above. The use of a characteristics map will be required if, in addition to the gradient of pedal angle wped_w, one or a plurality of further input variables is to be considered as well when determining the instantaneous driving situation in the overrun condition. This may be the driving speed, for instance. The characteristics curve or the characteristics map may be applied in a suitable manner on a test stand, for example, in order to assign to the particular time gradient of pedal angle wped_w a particular suitable setpoint value wped_wsetpoint for the pedal angle, and thus a suitable degree of opening of throttle valve 5 for setting the desired engine braking torque in the overrun condition.

Figure 2:
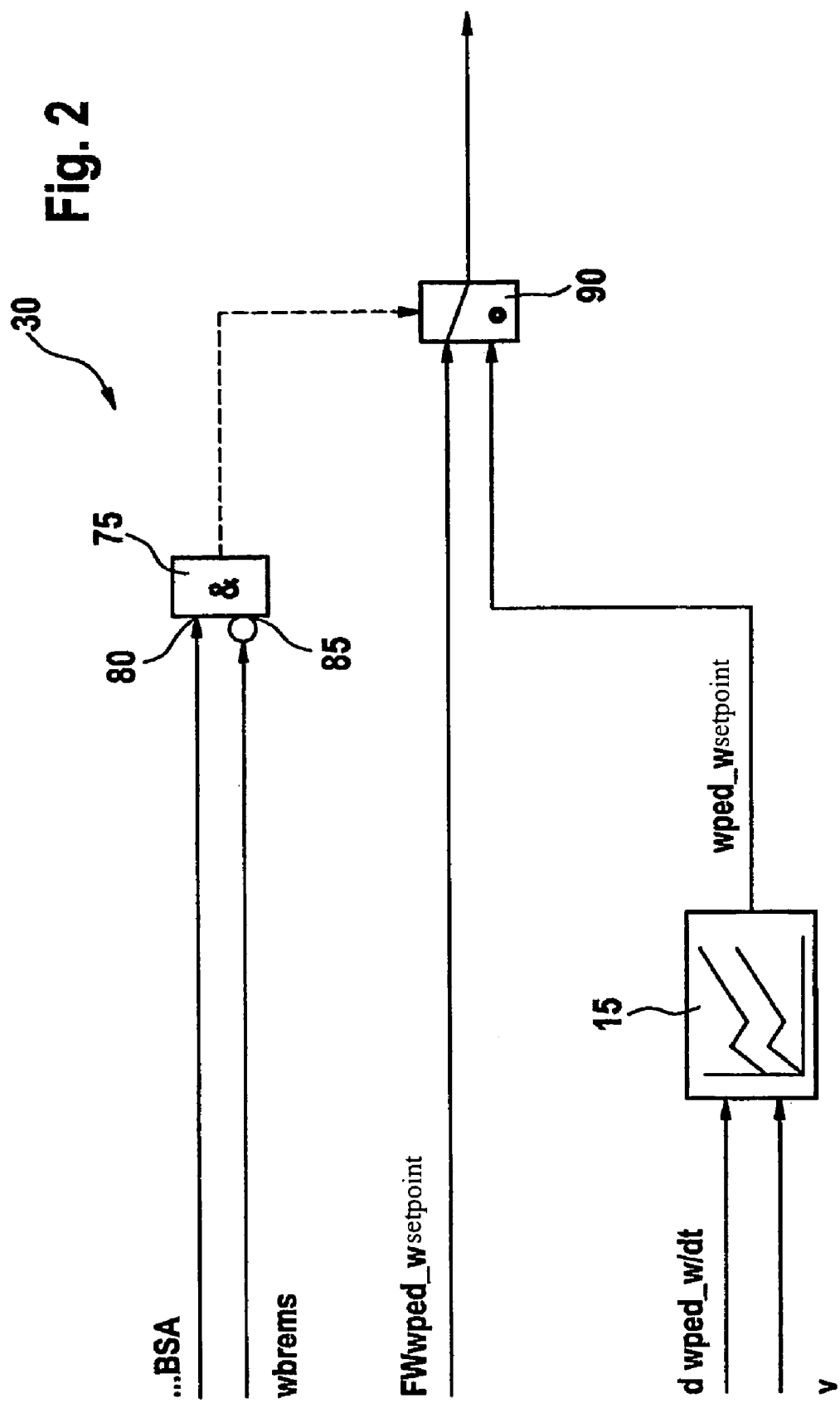
FIG. 2 shows a functioning diagram of an exemplary implementation of the method according to the present invention and the device according to the present invention.

FIG. 2 shows a flow chart illustrating the setting of the degree of opening of throttle valve 5 as a function of the driving situation in overrun condition, in this case, setpoint value wped_wsetpoint for the pedal angle being specified as a characteristic variable for the degree of opening of throttle valve 5, controlled by a characteristics map as a function of the gradient of pedal angle wped_w and the driving speed. Reference numeral 30 in FIG. 2 denotes a control unit, which may be implemented in engine control 25 in the form of hardware and/or software, for instance. A controlled switch 90 of control unit 30 is supplied, on the one hand, with a setpoint value FWwped_wsetpoint for the pedal angle in accordance with a driver command or a request by a vehicle function such as an anti-lock braking system, a traction control, an electronic stability program or the like, and with output variable wped_wsetpoint of a characteristics map 15, which also represents a setpoint value for the pedal angle, on the other hand. Controlled switch 90 is triggered by an output signal of an AND gate 75. If this output signal of AND gate 75 is set, controlled switch 90 is induced to make available output signal wped_wsetpoint of characteristics map 15 at its output. If this output signal of AND gate 75 is not set, controlled switch 90 is induced to make available signal FWwped_wsetpoint at its output. A first input 80 of AND gate 75 is supplied with an overrun turn-off signal BSA, which indicates whether combustion engine 1 or the vehicle is in overrun condition, i.e., that overrun condition is active. This may easily be determined in engine control 25 by checking whether accelerator 10 has been released and is therefore no longer being operated. In this case overrun operation is present and engine control 25 sets overrun turn-off signal BSA. Otherwise, i.e., when the accelerator is still being operated, no overrun condition exists and engine control 25 will not set or reset overrun turn-off signal BSA. A brake pedal signal wbrake, which is set by engine control 25 when the brake pedal is operated and which will not be set or reset by engine control 25 when the brake pedal is not being operated, is supplied to a second inverted input 85 of AND gate 75. To this end, engine control 25 evaluates the degree of operation of the brake pedal provided by brake pedal module 20 in a corresponding manner. Thus, the output signal of AND gate 75 will be set only when overrun condition is present and the brake pedal is not being operated. Otherwise the output signal of AND gate 75 will not be set. Input variables of characteristics map 15 are vehicle speed v, which is ascertained by speed sensor 65, and time gradient dwped_w/dt of pedal angle wped_w supplied to engine control 25 by accelerator module 10, time gradient dwped_w/dt being formed by engine control 25. Characteristics map 15 assigns to time gradient dwped_w/dt of the pedal angle and speed v setpoint value wped wsetpoint for the pedal angle, which leads to the corresponding desired degree of opening of throttle valve 5. It may be provided here that, with increasing time gradient dwped_w/dt of pedal angle wped_w and constant vehicle speed v, setpoint value wped_wsetpoint for the pedal angle and thus the degree of opening of throttle valve 5 be increased so as to reduce the engine braking torque, and, with increasing driving speed v and constant time gradient dwped_w/dt of pedal angle wped_w, setpoint value wped_wsetpoint for the pedal angle and thus the degree of opening of throttle valve 5 be reduced so as to increase the engine braking torque, thereby increasing the traffic safety by lowering the driving speed in overrun condition.

If the instantaneous driving situation is ascertained as described, as a function of time gradient dwped_w/dt of pedal angle wped_w, time gradient dwped_w/dt of pedal angle wped_w is the time gradient present when the accelerator is released to attain the overrun condition.

In addition or as an alternative to determining the instantaneous driving situation as a function of time gradient dwped_w/dt of pedal angle wped_w, the instantaneous driving situation may also be determined by evaluating an operation of the brake pedal. It may be provided, in this context, that the degree of opening of throttle valve 5 be reduced in the direction of the closed position of throttle valve 5 when the brake pedal is depressed, it being possible in this case for throttle valve 5 to be closed completely, for instance; and it may be provided that the degree of opening of throttle valve 5 be increased in the direction of a complete opening of throttle valve 5 when the brake pedal is released, it being possible in this case for throttle valve 5 to be opened completely, for instance. The operation or non-operation of the brake pedal is ascertained by engine control 25 from the degree of operation of the brake pedal supplied by brake pedal module 20. Thus, an instantaneous driving situation in overrun condition is able to be detected on the basis of the degree of operation of the brake pedal with a view toward a desired high engine braking torque, when an operated brake pedal is established. Conversely, an instantaneous driving situation in overrun condition is able to be detected on the basis of the degree of operation of the brake pedal with a view toward a desired low engine braking torque, when a released brake pedal is established.

Also in the event that the instantaneous driving situation is determined as a function of the degree of operation of the brake pedal, it may be provided that various degrees of operation of the brake pedal are assigned in each case to different degrees of opening of throttle valve 5, such assignment being able to be carried out via a characteristics curve. This in turn results in a more discriminating setting of the degree of opening of throttle valve 5 as a function of the degree of operation of the brake pedal. If the instantaneous driving situation is determined by other variables as well such as driving speed v and/or time gradient dwped_w/dt of pedal angle wped_w, all of these variables characterizing the instantaneous driving situation may be entered as input variables into a characteristics map whose output variable is the degree of opening of throttle valve 5 or a variable characterizing the degree of opening of throttle valve 5, such as setpoint value wped_wsetpoint for pedal angle wped_w that was mentioned. The characteristics curve or characteristics map may in turn be applied in a suitable manner on a test stand, for instance. On the basis of characteristics map 15 in FIG. 2 and according to the flow chart therein, the degree of operation of the brake pedal may be entered as additional input variable of characteristics map 15, setpoint value wped_wsetpoint of pedal angle wped_w and thus the degree of opening of throttle valve 5 being reduced with increasing operation of the brake pedal and constant driving speed v and constant time gradient dwped_w/dt of pedal angle wped_w. In this case, controlled switch 90 may also be controlled solely by overrun turn-off signal BSA, in such a way that the output of characteristics map 15 is present at the output of controlled switch 90 if overrun turn-off signal BSA is set, and otherwise setpoint value FWwped_wsetpoint is present.

In addition or as an alternative to determining the instantaneous driving situation as a function of time gradient dwped_w/dt of pedal angle wped_w and/or the degree of operation of the brake pedal and/or driving speed v, the instantaneous driving situation may also be determined by evaluating information regarding the inclination of the vehicle relative to the horizontal line. For this purpose, engine control 25 evaluates the signal of inclinometer 70. It is possible that an inclination threshold value N for the inclination of the vehicle relative to the horizontal is specified in engine control 25. For example, it may be provided that the degree of opening of throttle valve 5 be reduced in the direction of the closed position of throttle valve 5 when specified inclination threshold value N is exceeded in absolute value by the inclination of the vehicle relative to the horizontal; in this case it being possible that throttle valve 5 is able to be completely closed, for instance, and it may be provided that the degree of opening of throttle valve 5 be increased in the direction of full opening of throttle valve 5 when specified inclination threshold value N is undershot in absolute value by the inclination of the vehicle relative to the horizontal; it is possible, in this case, for throttle valve 5 to be opened completely, for instance. As a result, in overrun operation, an instantaneous driving situation may be detected on the basis of the inclination of the vehicle relative to the horizontal with respect to a desired high engine braking torque when a high roadway incline in absolute value is detected that is above threshold value N and corresponds to the inclination of the vehicle relative to the horizontal. In this case a high engine braking torque is desired for reasons of traffic safety. Conversely, it is possible to detect an instantaneous driving situation in overrun condition on the basis of the inclination of the vehicle relative to the horizontal in view of a desired low engine braking torque if a small corresponding roadway incline in absolute value is below inclination threshold value N and corresponds to the inclination of the vehicle relative to the horizontal line. In this case, no high engine braking torque is required for reasons of traffic safety, and a lower engine braking torque may be set. Inclination threshold value N may be suitably selected on a test stand, for example, or in driving tests so as to satisfy the required demands with respect to traffic safety.

In the event that the instantaneous driving situation is determined as a function of the inclination of the vehicle relative to the horizontal, provision may also be made to assign various inclinations of the vehicle relative to the horizontal to a different degree of opening of throttle valve 5 in each case, the assignment being implementable via a characteristics curve. In this manner, a more discriminating setting of the degree of opening of throttle valve 5 as a function of the vehicle inclination relative to the horizontal may be achieved again. If the instantaneous driving situation is determined by other variables as well such as driving speed v and/or time gradient dwped_w/dt of pedal angle wped_w, and/or the operation of the brake pedal, all of these variables characterizing the instantaneous driving situation may be entered as input variables into a characteristics map whose output variable is the degree of opening of throttle valve 5 or a variable characterizing the degree of opening of throttle valve 5, such as setpoint value wped_wsetpoint for pedal angle wped_w that was mentioned. The characteristics curve or characteristics map may in turn be applied in a suitable manner on a test stand, for instance. On the basis of characteristics map 15 in FIG. 2 and according to the flow chart therein, the inclination of the vehicle with respect to the horizontal may be entered as additional input variable of characteristics map 15; as the inclination of the vehicle relative to the horizontal increases in absolute value, at constant driving speed v, and constant time gradient dwped_dt of pedal angle wped_w, and constant degree of operation of the brake pedal, setpoint value wped_wsetpoint of pedal angle wped_w, and thus the degree of opening of throttle valve 5, being reduced. In this case, controlled switch 90 may also be controlled solely by overrun turn-off signal BSA, in such a way that the output of characteristics map 15 is present at the output of controlled switch 90 if overrun turn-off signal BSA is set, and otherwise setpoint value FWwped_wsetpoint is present.

Furthermore, it may optionally be provided that upon detection of a fault in a safety-relevant component or property or performance quantity of the vehicle or of combustion engine 1, the degree of opening of throttle valve 5 be reduced in the direction of the closed position of throttle valve 5 for reasons of safety so as to increase the engine braking torque and to brake the vehicle as quickly as possible. In this context, the greatest braking action is achieved when throttle valve 5 is closed completely. The anti-lock braking system or power brakes may be cited as examples for a safety-relevant component of the vehicle. Engine temperature or engine oil level are mentioned as example for a safety-relevant operating variable of combustion engine 1. If safety-relevant components fail or if they are detected to be faulty in some other way by engine control 25 or if safety-relevant characteristics or performance quantities are outside their permissible range, throttle valve 5 will be moved in the direction of its closed position and preferably closed completely in the case of an overrun condition, independently of the instantaneous driving situation, in an effort to attain the greatest possible engine braking torque.

Figure 3:
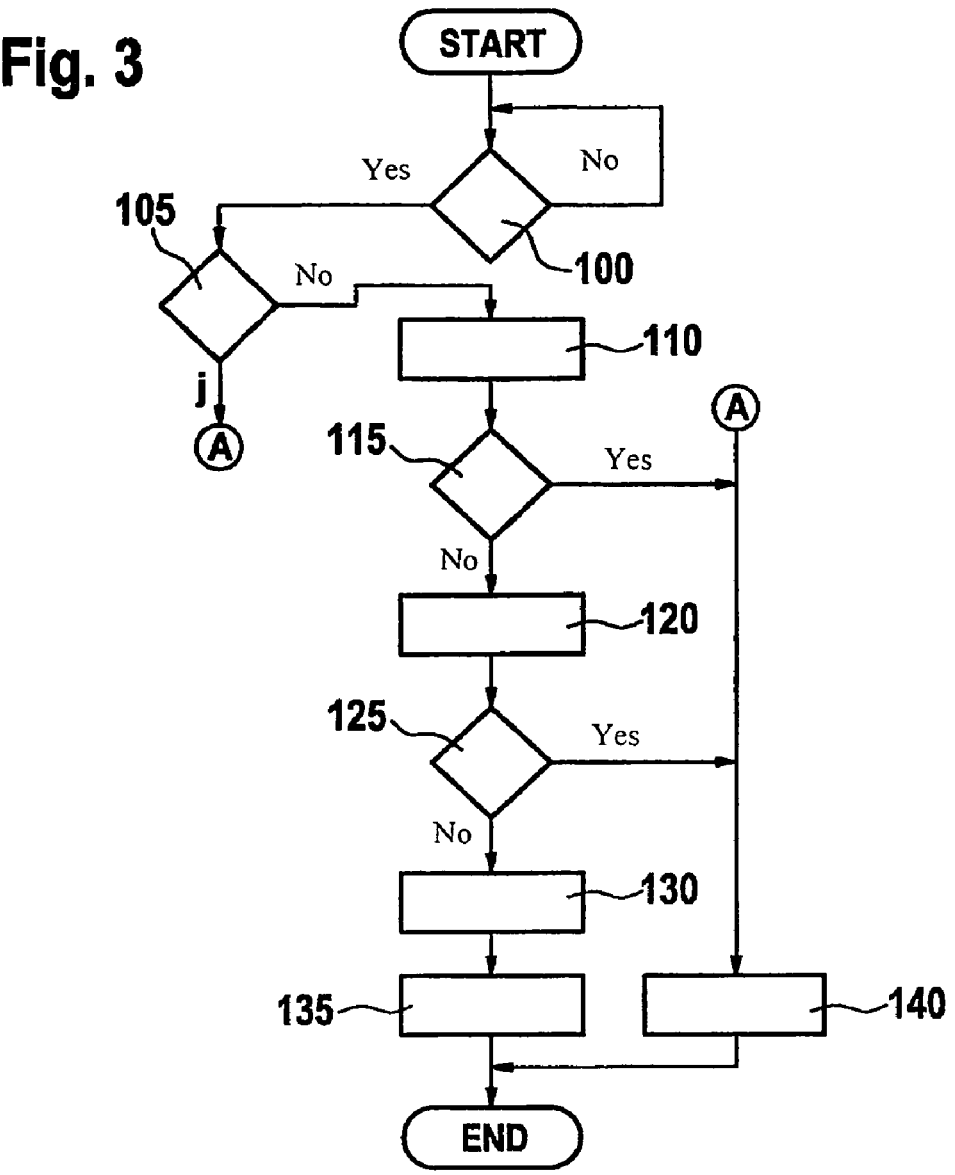
FIG. 3 shows a flow chart for the exemplary sequence of the method according to the present invention.

FIG. 3 shows a flow diagram for an exemplary sequence of the method according to the present invention. Following the program start, engine control 25 tests in a program point 100 whether an overrun condition is present. If this is the case, the program branches to a program point 105, otherwise the program branches back to program point 100. The check for overrun condition may be carried out as described, in that engine control 25 evaluates the degree of operation of the accelerator. If the accelerator is released, engine control 25 detects an overrun condition and sets overrun turn-off signal BSA, otherwise engine control 25 detects a traction state and resets overrun turn-off signal BSA.

At program point 105, engine control 25 checks whether a fault has occurred in a safety-relevant component or performance variable of the vehicle or internal combustion engine 1. If so, the program branches to a program point 140; otherwise the program branches to a program point 110.

At program point 110, engine control 25 evaluates the degree of operation of the brake pedal, in the manner described. The program then branches to a program point 115.

At program point 115, engine control 25 checks whether the brake pedal has been operated. If so, the program branches to program point 140; otherwise the program branches to a program point 120.

At program point 120, engine control 25 evaluates the information from inclinometer 70 and ascertains the inclination of the vehicle relative to the horizontal and thus the rising of the roadway. The program then branches to a program point 125.

At program point 125, engine control 25 checks whether the inclination of the vehicle relative to the horizontal is higher in its absolute value than specified inclination threshold value N. If so, the program branches to program point 140; otherwise the program branches to a program point 130.

At program point 130, in the manner described, engine control 25 determines time gradient dwped_w/dt of pedal angle wped_w that was present when the accelerator was released to achieve overrun operation. To this end, the degrees of operation of the accelerator are sampled, in a time-discrete manner, from the signal provided by accelerator module 10 and stored, so that the degrees of operation of the accelerator are present in engine control 25 when the accelerator is released in order to set an overrun condition and may be used to calculate time gradient dwped_w/dt of pedal angle wped_w. In addition, engine control 25 determines instantaneous driving speed v. Then branching to a program point 135 takes place.

At program point 135, setpoint value wped_wsetpoint for the pedal angle and thus the degree of opening of throttle valve 5 to be set will be ascertained by engine control 25, according to characteristics map 15 of the flow chart of FIG. 2 (which will not be discussed further here) is ascertained as a function of driving speed v and time gradient dwped_w/dt of pedal angle wped_w, and implemented by engine control 25. The program is then ended.

At program point 140, engine control 25 induces the complete closing of throttle valve 5. Subsequently the program is exited.

According to the flow chart of FIG. 3, it is therefore a mixed form of adjustment of the engine braking torque in overrun condition that is introduced by way of example, the adjustment being based on a characteristics curve and threshold value. The instantaneous driving situation with respect to the degree of operation of the brake pedal and with respect to the inclination of the vehicle with respect to the horizontal is determined using a threshold-value decision, and with respect to gradient dwped_w/dt of pedal angle wped_w of the accelerator and vehicle speed v is ascertained with the aid of a characteristics map. Furthermore, to ascertain the instantaneous driving situation, the evaluation of the brake-pedal operation has priority over the evaluation of inclinometer 70, and the evaluation of inclinometer 70 has priority over the evaluation of gradient dwped_w/dt of pedal angle wped_w of the accelerator and driving speed v.

Figure 4:
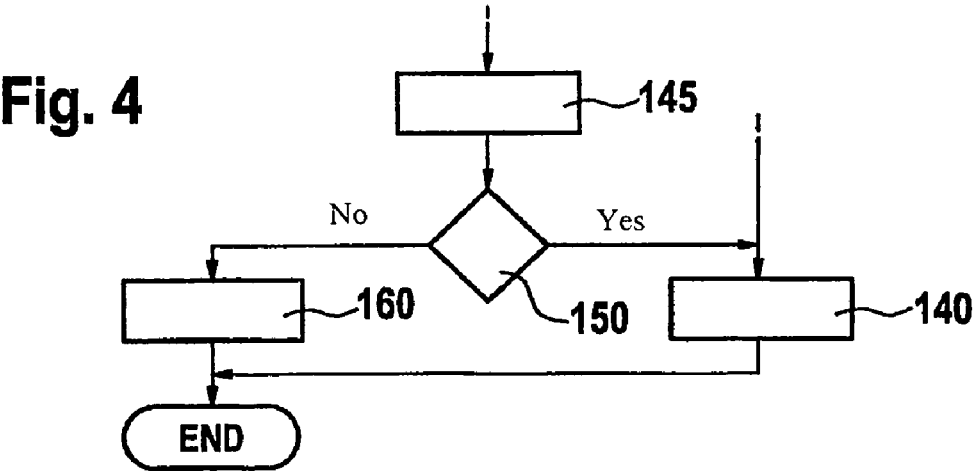
FIG. 4 shows an alternative flow chart to the flow chart as in FIG. 3.

FIG. 4 represents a modification of the flow chart according to FIG. 3. Here, program points 130 and 135 are replaced by the flow chart according to FIG. 4. In all other respects, the flow chart according to FIG. 3 is retained in unchanged form. According to the specific embodiment of FIG. 4, a branching from program point 125 to a program point 145 therefore takes place in a no-decision.

At program point 145, in the manner described and as at program point 130 according to FIG. 3, engine control 25 ascertains time gradient dwped_w/dt of pedal angle wped_w that was present when the accelerator was released to achieve overrun operation. The program then branches to a program point 150.

At program point 150, engine control 25 checks whether time gradient dwped_w/dt is below specified threshold value Swped_w. If so, the program branches to program point 140; otherwise the program branches to a program point 160.

At program point 140, engine control 25 induces a complete closing of throttle valve 5. Program point 140 has been adopted in this case from the flow chart of FIG. 3. The program is then ended.

At program point 160, engine control 25 induces the complete opening of throttle valve 5. Subsequently the program is exited.

The two flow charts according to FIG. 3 and FIG. 4 each show an exemplary sequence of the method according to the present invention. In general, it is possible to ascertain the instantaneous driving situation with respect to each mentioned criterion: time gradient dwped_w/dt of pedal angle wped_w, degree of operation of the brake pedal, driving speed v, inclination of the vehicle relative to the horizontal, controlled via characteristics curve or characteristics map or controlled via a threshold value and in any sequence, in a hierarchical or non-hierarchical manner, for instance with the aid of a single characteristics map for all mentioned criteria. Additional criteria such as the engine speed, which is ascertained by engine speed sensor 60, may be utilized to determine the instantaneous driving situation. The more criteria are utilized to determine the instantaneous driving situation, the finer and more precisely the instantaneous driving situation is able to be determined. In the manner described, the degree of opening of throttle valve 5 to be set in overrun condition or a variable, which characterizes the degree of opening of throttle valve 5 and is to be set, is then determined from the ascertained instantaneous driving situation.

The method according to the present invention may be suspended if higher-priority goals, related to exhaust-gas demands or component protection demands, for instance, should warrant this.

In the example described above, it was stated that the air supply that is to be set may be ascertained as a function of the gradient of the pedal angle, in each case using a characteristics curve or a characteristics map. If, in addition or alternatively to the air supply, one takes the ignition angle that is to be set as an actuating variable and/or the fuel supply that is to be set and/or the gear ratio that is to be set, then this actuating variable, too, may be ascertained as a function of the gradient of the pedal angle, and in general of a variable derived from the operation of the accelerator, using in each case a characteristics curve or a characteristics map. This similarly applies to the case in which, instead of the gradient of the variable derived from the operation of the accelerator, alternatively or in addition the gradient of the variable derived from the specification for the output variable of drive unit 180 is ascertained, using in each case a characteristics line or a characteristics field.

Furthermore, it may alternatively be provided that, instead of an accelerator that is movable over a length of travel, only a pressure sensor is used which experiences practically no position change in response to being operated by the driver. In this case, the gradient of the variable derived from the operation of the operating element would be, for instance, the gradient of the curve over time of the pressure ascertained by the pressure sensor, that is, the change of pressure with time.

What is claimed is:

1. A method for operating a drive unit of a vehicle, comprising:
   setting, in an overrun condition of the drive unit, an output variable of the drive unit according to a preset driving strategy;
   specifying at least two preset driving strategies for the overrun condition of the drive unit;
   selecting, in the overrun condition, one of the specified driving strategies as a function of a driving situation;
   setting the output variable by at least one actuating variable of the drive unit;
   setting the at least one actuating variable as a function of the selected driving strategy; and
   selecting at least one of an ignition angle and a gear ratio as the at least one actuating variable.

2. The method as recited in claim 1, further comprising:
   in response to a presence of a first driving situation, selecting a first driving strategy, in which at least one of:
   the ignition angle is reset in a late direction, and
   the gear ratio is reduced; and
   in response to a presence of a second driving situation, selecting a second driving strategy, in which at least one of:
   the ignition angle is reset in an early direction, and
   the gear ratio is increased.

3. The method as recited in claim 1, further comprising:
   ascertaining the driving situation by evaluating one of a first gradient of a variable derived from an operation of an operating element and a second gradient of a variable derived from a specification for the output variable of the drive unit;
   detecting the first driving situation if one of the first gradient and the second gradient falls below a prespecified threshold value; and
   detecting the second driving situation if one of the first gradient and the second gradient exceeds the prespecified threshold value.

4. The method as recited in claim 3, further comprising:
   ascertaining at least one of the ignition angle that is to be set and the gear ratio that is to be set as a function of one of the first gradient and the second gradient, using in each case one of a characteristics curve and a characteristics map.

5. The method as recited in claim 1, further comprising:
   ascertaining the driving situation by evaluating an operation of a brake pedal; and
   detecting a first driving situation if the brake pedal is depressed; and
   detecting a second driving situation if the brake pedal is released.

6. The method as recited in claim 1, further comprising:
   ascertaining the driving situation by evaluating information regarding an inclination of the vehicle with respect to a horizontal;
   detecting a first driving situation in response to an exceeding in absolute value of a prespecified threshold value by the inclination; and
   detecting a second driving situation in response to a falling below in absolute value of the prespecified threshold value by the inclination.

7. The method as recited in claim 1, further comprising:
   ascertaining the driving situation by evaluating one of a travel speed, a preceding vehicle, and a detected obstacle on one of a roadway and a traffic routing.

8. The method as recited in claim 1, further comprising:
   detecting a first driving situation if a ratio of an engine speed to a vehicle speed exceeds a prespecified threshold value; and
   detecting a second driving situation if the ratio does not exceed the prespecified threshold value.

9. The method as recited in claim 1, further comprising:
   detecting a first driving situation if at least one of:
   a distance from a preceding vehicle falls below a prespecified threshold value,
   an approach speed to the preceding vehicle exceeds a prespecified threshold value,
   an obstacle on a roadway is detected, and
   an approach of the vehicle to one of a curve, a crossing, and a junction is detected; and
   detecting a second driving situation if at least one of:
   a distance from a preceding vehicle exceeds a prespecified threshold value,
   an approach speed to the preceding vehicle falls below a prespecified threshold value,
   an obstacle on a roadway is not detected, and an approach of the vehicle to one of a curve, a crossing, and a junction is not detected.

10. The method as recited in claim 1, further comprising:
detecting a first driving situation if a transmission downshifting is detected within a predefined time; and
detecting a second driving situation if the transmission downshifting is not detected within the predefined time.

11. The method as recited in claim 1, further comprising:
detecting a first driving situation if, in the case of an automatic transmission, a position of one of a selector lever and an operating element corresponding thereto is in a different setting than one of "drive" and "D"; and
detecting a second driving situation if, in the case of the automatic transmission, the position of one of the selector lever and the operating element corresponding thereto is in a setting associated with one of "drive" and "D."

12. The method as recited in claim 1, further comprising:
in response to a detection of a fault in a safety-relevant component of one of the vehicle and the drive unit, at least one of:
reducing an air supply,
shifting the ignition angle in a late direction,
reducing a fuel supply, and
reducing the gear ratio.

13. The method as recited in claim 1, wherein:
in the presence of a first driving situation, a first prespecified threshold value for an operating variable of the drive unit, corresponding to an engine speed, above which a fuel supply is completely interrupted, is at a lower value than in a presence of a second driving situation.

14. The method as recited in claim 1, wherein:
in the presence of a first driving situation, a second prespecified threshold value for an operating variable of the drive unit, corresponding to an engine speed, below which a fuel supply is resumed again after a previous interruption, is at a lower value than in a presence of the second driving situation.

15. The method as recited in claim 1, further comprising:
ascertaining a probability for a presence of one of a first driving situation and a second driving situation from which condition is, or which conditions are present for the detection of the corresponding driving situation; and
detecting one of the first driving situation and the second driving situation only if a corresponding probability of their being present exceeds a prespecified threshold value.

16. The method as recited in claim 1, further comprising:
specifying a minimum value for the output variable in a selection of a first driving strategy.

17. The method as recited in claim 1, further comprising:
reducing the output variable of the drive unit by a first driving strategy; and
one of maintaining and increasing the output variable of the drive unit by a second driving strategy.

18. A device for operating a drive unit of a vehicle, comprising:
a first setting arrangement for setting an output variable of the drive unit in an overrun condition of the drive unit according to a preset driving strategy;
a specification arrangement for specifying at least two preset driving strategies for the overran condition of the drive unit;
a selection arrangement for, in the overrun condition, selecting one of the specified driving strategies as a function of a driving situation; and
a second setting arrangement for setting the output variable by at least one actuating variable of the drive unit and for setting the at least one actuating variable as a function of the selected driving strategy, wherein the least one actuating variable includes at least one of an ignition angle and a gear ratio.

* * * * *

UNITED STATES PATENT AND TRADEMARK OFFICE
CERTIFICATE OF CORRECTION

PATENT NO. : 7,594,496 B2  Page 1 of 1
APPLICATION NO. : 10/583655
DATED : September 29, 2009
INVENTOR(S) : Frenz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 238 days.

Signed and Sealed this

Twenty-eighth Day of September, 2010

David J. Kappos
*Director of the United States Patent and Trademark Office*